(12) United States Patent
Berman

(10) Patent No.: US 8,741,458 B2
(45) Date of Patent: Jun. 3, 2014

(54) BATTERY WITH OVER-PRESSURE PROTECTION

(75) Inventor: Stephen Gregory Berman, Mailbu, CA (US)

(73) Assignee: Jakks Pacific, Inc., Malibu, CA (US)

( * ) Notice: Subject to any disclaimer, the term of this patent is extended or adjusted under 35 U.S.C. 154(b) by 1245 days.

(21) Appl. No.: 12/036,458

(22) Filed: Feb. 25, 2008

(65) Prior Publication Data

US 2009/0214935 A1 Aug. 27, 2009

(51) Int. Cl.
*H01M 2/34* (2006.01)
*H01M 10/44* (2006.01)
*H01M 2/10* (2006.01)
*H01M 10/0525* (2010.01)

(52) U.S. Cl.
CPC ............ *H01M 2/1066* (2013.01); *H01M 2/345* (2013.01); *Y02E 60/12* (2013.01); *H01M 10/445* (2013.01); *H01M 10/0525* (2013.01)
USPC .................................. 429/61; 429/57; 429/59

(58) Field of Classification Search
USPC ................................ 429/61, 57, 59, 149, 150
See application file for complete search history.

(56) References Cited

U.S. PATENT DOCUMENTS

| 4,025,696 A | 5/1977 | Tucholski et al. ............... 426/61 |
| 4,028,478 A | 6/1977 | Tucholski ........................ 429/61 |
| 4,217,400 A | 8/1980 | Leffingwell ...................... 429/7 |
| 4,275,739 A * | 6/1981 | Fischell .............................. 607/9 |
| 4,315,364 A | 2/1982 | Leffingwell .................. 29/623.1 |
| 4,690,879 A | 9/1987 | Huhndorff et al. ............. 429/61 |
| 4,756,983 A | 7/1988 | Tucholski ........................ 429/61 |
| 4,818,641 A | 4/1989 | Ledenican ....................... 429/61 |
| 4,871,553 A | 10/1989 | Huhndorff ....................... 429/61 |
| 4,937,153 A | 6/1990 | Huhndorff ....................... 429/61 |
| 5,008,161 A | 4/1991 | Johnston ............................ 429/7 |
| 5,026,615 A | 6/1991 | Tucholski ........................ 429/61 |
| 5,171,648 A | 12/1992 | Beard .............................. 429/61 |
| 5,300,369 A | 4/1994 | Dietrich et al. ..................... 429/7 |
| 5,529,581 A | 6/1996 | Cusack ........................... 606/181 |
| 5,567,539 A | 10/1996 | Takahashi et al. .............. 429/57 |
| 5,609,972 A | 3/1997 | Kaschmitter et al. ........... 429/56 |
| 5,691,073 A | 11/1997 | Vu et al. ............................. 429/7 |
| 5,741,606 A | 4/1998 | Mayer et al. .................... 429/53 |
| 6,392,172 B1 * | 5/2002 | Azema ....................... 200/61.08 |
| 6,878,481 B2 | 4/2005 | Bushong et al. ................ 429/54 |

(Continued)

FOREIGN PATENT DOCUMENTS

JP 2001229911 A * 8/2001

OTHER PUBLICATIONS

JP 2001-229911 A English translation.*

*Primary Examiner* — Ula C Ruddock
*Assistant Examiner* — Scott J Chmielecki
(74) *Attorney, Agent, or Firm* — Kusner & Jaffe

(57) ABSTRACT

A battery assembly includes a sealed battery cell container holds a positive and negative electrode and an electrolyte. Deflection-responsive means engages at least one outer face of the container and is responsive to deflection thereof for operating a cut-off switch to break the electrical continuity of the battery assembly. Flat battery cell containers may be stacked in different arrangements within a coupling structure, the arrangements defining either a cavity between the coupling structure and an adjacent container face, or a cavity between faces of adjacent cell containers. A membrane switch received in the cavity is actuated by bulging of a cell container wall. A control circuit operates the cut-off switch in response to actuation of the membrane switch.

14 Claims, 5 Drawing Sheets

(56) References Cited

U.S. PATENT DOCUMENTS

| | | |
|---|---|---|
| 7,157,181 B2 | 1/2007 | Wiepen .................. 429/161 |
| 7,535,199 B2 * | 5/2009 | Kimura et al. ............. 320/121 |
| 2003/0003357 A1 * | 1/2003 | Tamai et al. .................. 429/181 |
| 2004/0137323 A1 * | 7/2004 | Sato .............................. 429/185 |
| 2007/0068782 A1 * | 3/2007 | Harper ........................ 200/83 R |
| 2009/0053586 A1 * | 2/2009 | Fredriksson et al. ........... 429/57 |

* cited by examiner

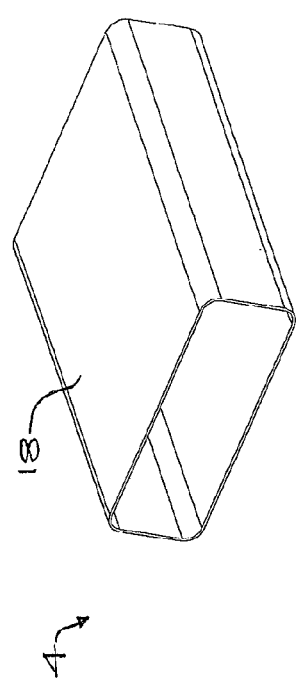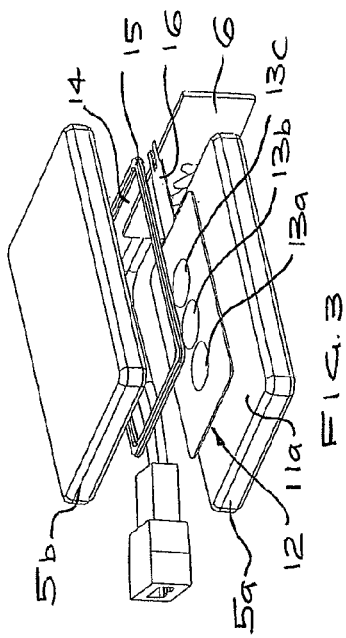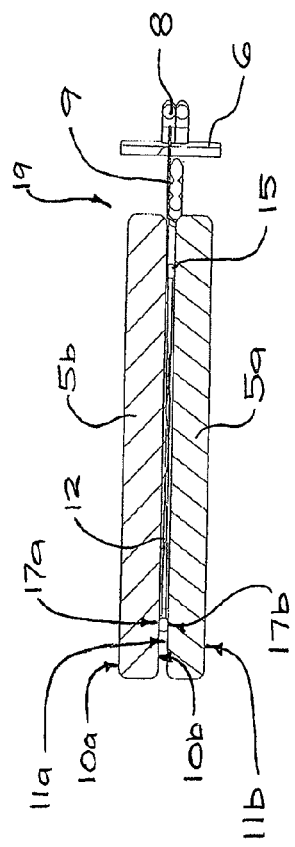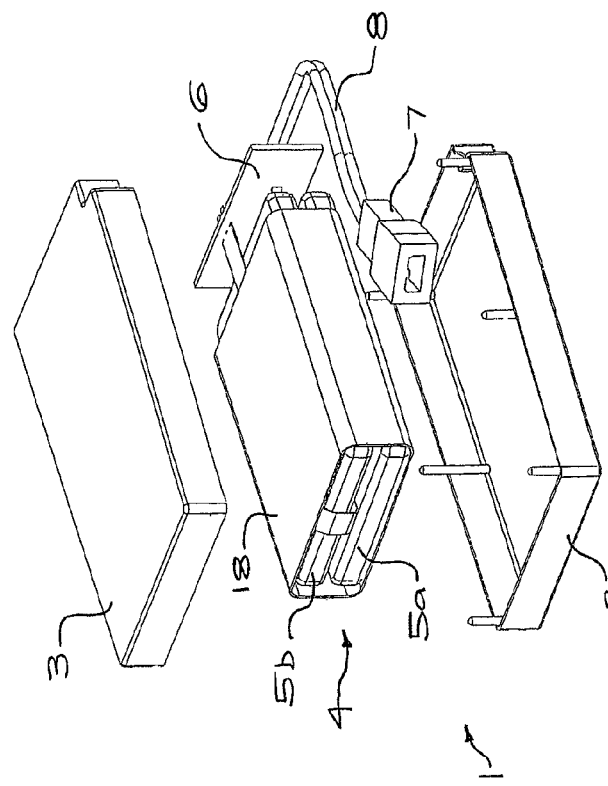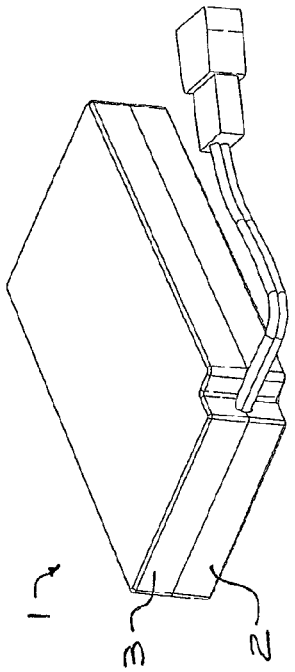

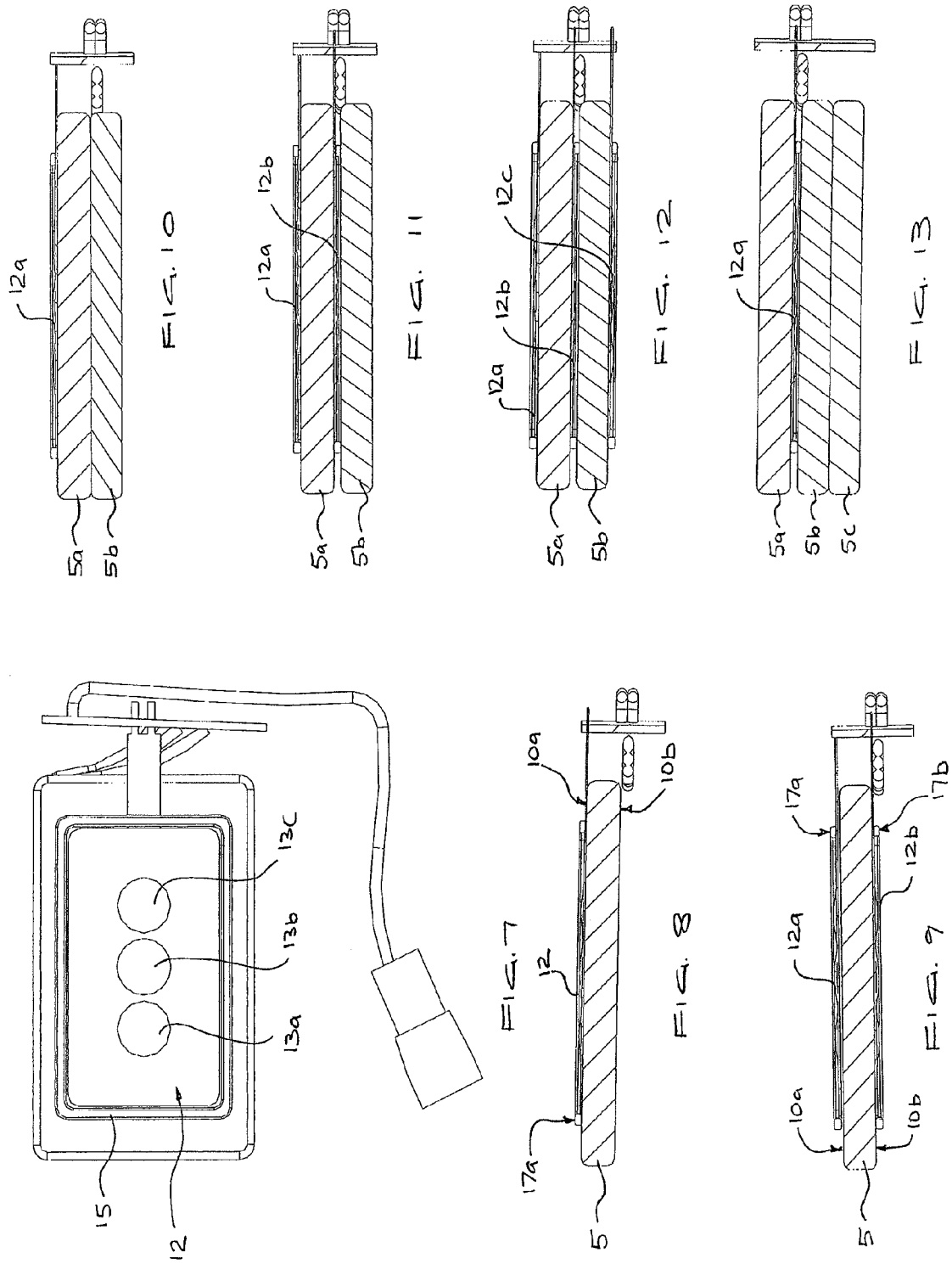

BATTERY WITH OVER-PRESSURE PROTECTION

FIELD OF THE INVENTION

The present invention relates to a battery assembly in which the electrical continuity of the assembly is broken in response to an increase in internal pressure in the cells.

BACKGROUND OF THE INVENTION

Rechargeable batteries are widely used for powering small portable electronic devices. Lithium ion batteries offer a high energy density and high operating voltage, together with a reasonable life. Other rechargeable batteries commonly used are lead batteries and nickel-metal-hydride batteries.

Sealed rechargeable battery cells can pose an explosion hazard when internal gas pressure rises uncontrollably, through over-charge or over-discharge. U.S. Pat. No. 4,025, 696 describes a cell with an internal overpressure safety switch responsive to deflection of the walls of the cell for breaking an electrical contact. The cell has a casing with cylindrical side walls and incorporates a Belleville spring element adjacent the bottom of the casing which is moved from a first to a second stable position by outward bulging of the bottom of the casing. However these switches take up space within each cell in a multi-cell battery, and are expensive.

Common over-pressure relief devices include vents or seals which are opened or ruptured under excess pressure. The venting or rupture are irreversible and once the seal of the cell is broken the corrosive and potentially harmful electrolyte can escape.

As an alternative, or further safeguard, rechargeable batteries are often provided with an integrated protection circuit which stops the charging of the battery due to avoid overcharging. The circuit senses battery temperature and/or pressure and cuts off current flow through the cell. These circuits are also expensive and suffer from a lack of positive action. It is an object of the present invention to overcome or substantially ameliorate the above disadvantages or more generally to provide an improved rechargeable battery.

SUMMARY OF THE INVENTION

According to one aspect of the present invention there is provided a battery assembly comprising:

a sealed battery cell container holding a positive and negative electrode and an electrolyte, the container having outer faces;

a cut-off switch electrically connected between one of the electrodes and an output of the device, the switch being operable to break the electrical continuity of the battery assembly, and deflection-responsive means engaging at least a first outer face and responsive to deflection thereof for operating the cut-off switch.

Preferably the deflection-responsive means comprises coupling structure fixed to the cell container and forming a cavity between the first outer face and the coupling structure, the cut-off switch is received in the cavity and is pressure-sensitive, whereby outward deflection of the first outer face tends to compress the cut-off switch.

Alternatively the deflection-responsive means comprises a member having first and second ends with complementary mechanical couplings fixed thereto, the couplings being connected such that the member forms a band extending about the cell container and tensioned to hold the member against the outer faces, the cut-off switch comprising a respective electrical contact fixed to each of the couplings, whereby the contacts are engaged when the couplings are connected and deflection of the outer faces tensions the member and tends to separate the couplings and contacts to break the electrical continuity of the battery assembly. In another alternative embodiment the cell container includes a plurality of sealed battery cell containers, the cell containers being layered to form a stack with outer stack faces; the deflection-responsive means comprises a member having first and second ends with complementary mechanical couplings fixed thereto, the couplings being connected such that the member forms a band extending about the stack and tensioned to hold the member against the outer stack faces, the cut-off switch comprising a respective electrical contact fixed to each of the couplings, whereby the contacts are engaged when the couplings are connected and deflection of the outer faces tensions the member and tends to separate the couplings and contacts to break the electrical continuity of the battery assembly.

The cell container preferably includes a plurality of sealed battery cell containers, each with opposing major outer faces; the deflection-responsive means comprising:

coupling structure joining the cell containers and forming a cavity between two adjacent outer faces, the cut-off switch comprising a pressure-sensitive switch received in the cavity.

Alternatively a pressure-sensitive switch is received in the cavity, the deflection-responsive means further including a control circuit operating the cut-off switch in response to a change of state of the pressure-sensitive switch.

The coupling structure preferably comprises a ring extending around the cavity and held between the two adjacent outer faces.

Preferably the pressure-sensitive switch comprises a membrane switch. Preferably the membrane switch comprises an array of switch elements. The array is preferably a linear array aligned with a central axis of both adjacent outer faces, with one switch element lying between central parts of the adjacent outer faces. Most preferably the switch elements are normally-open switch elements electrically connected in parallel.

Preferably the coupling structure comprises a tubular member and the opposing major outer faces are substantially planar and parallel, the control circuit including a PCB lying in a plane substantially orthogonal to a plane of the major outer faces.

Preferably the battery assembly further includes a cable connected to the PCB that terminates in an output jack for making an electrical connection to the battery, the cell containers, coupling structure and PCB being enclosed between shell-type casing halves from which the cable and output jack protrude. Preferably the battery cell containers are lithium ion battery cell containers.

This invention provides a battery assembly which is effective and efficient in operational use, and which has an overall simple design which minimizes manufacturing costs. Therefore it may be used, not only as a primary over-pressure protection, but can be used as further safeguard in addition to over-pressure protection sensors or features provided in the battery cells themselves.

BRIEF DESCRIPTION OF THE DRAWINGS

Preferred forms of the present invention will now be described by way of example with reference to the accompanying drawings, wherein:

FIG. 1 is a pictorial view of a first embodiment of the battery of the invention;

FIG. 2 is an exploded pictorial view of the battery of FIG. 1;

FIG. 3 is an exploded pictorial view of the cell and circuit assembly of the battery of FIG. 1;

FIG. 4 is a schematic longitudinal cross-section of the cell and circuit assembly of the battery of FIG. 1;

FIG. 7 is a plan view of the cell and circuit assembly of a second embodiment of the battery of the invention;

FIGS. 8 to 21 are schematic longitudinal cross-sections of the cell and circuit assembly of second through fifteenth embodiments respectively of the battery of the invention;

DETAILED DESCRIPTION OF PREFERRED EMBODIMENTS

Figure 5:
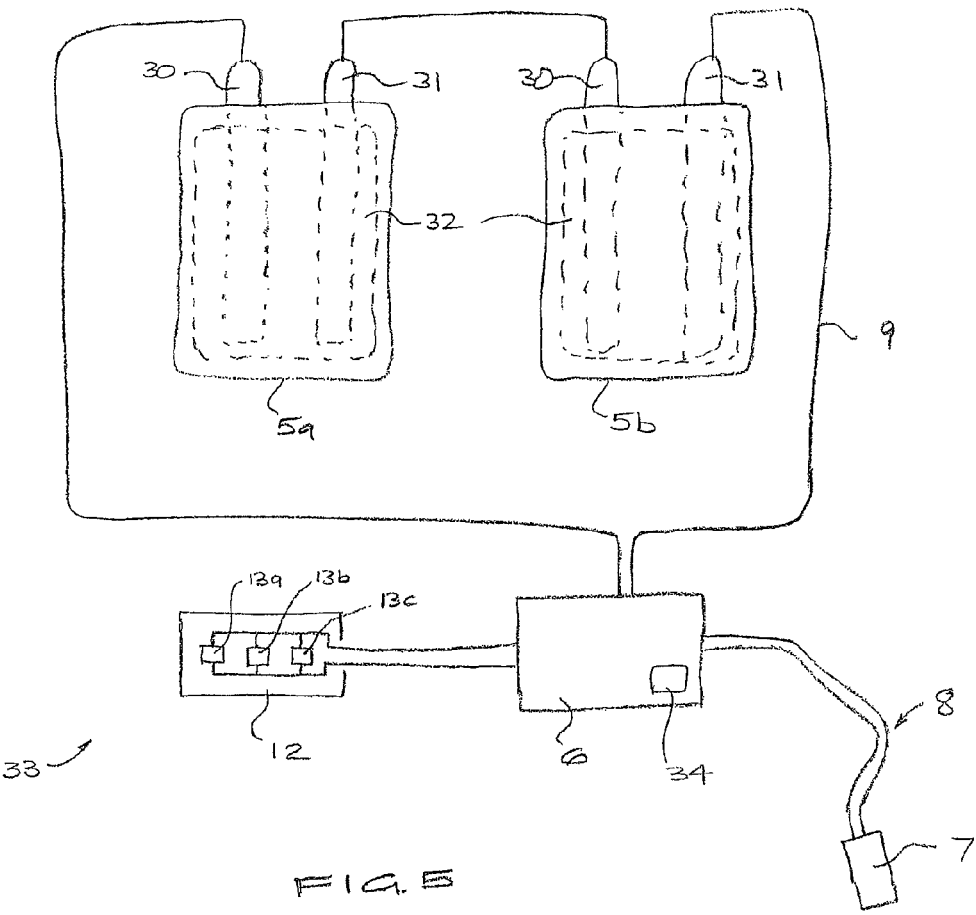
FIG. 5 is a schematic circuit diagram of the circuit of the battery of FIG. 1.

Referring to the drawings, particularly FIGS. 1-6, a battery assembly 1 includes shell-type casing halves 2, 3 molded from polymeric material and fixed together to enclose a cell and circuit assembly 4. The assembly 4 includes two sealed lithium ion battery cell containers 5a, 5b electrically connected by couplings 9 to a printed circuit board (PCB) 6. A cable 8 connected to the PCB 6 terminates in an output jack 7 for making an electrical connection to the battery.

The cell containers 5a, 5b are generally in the form of a flat rectangular prism, having planar major surfaces 10a, 10b, 11a, 11b on respective opposing sides. A deflection-responsive assembly includes cover 18 and ring 15 forming a coupling structure and the membrane switch assembly 12. The switch assembly 12 is received in a cavity 14 defined between the innermost faces 11a, 10b and the ring 15. The ring 15 has rectangular shape complementary to the outer edge of the switch assembly 12 and opposing planar faces 17a, 17b. The ring 15 is formed of a substantially rigid polymer. A neck 16 of the switch assembly 12 includes electrical conductors (not shown) and extends through a channel (not shown) in the ring 15 to connect to the PCB 6.

The rigid tubular outer cover 18 is elongated parallel to a longitudinal axis of the cell containers 5a, 5b and conforms tightly to the outer surfaces 10a, 11b to clamp the ring 15 between the surfaces 10b and 11a. The PCB 6 lies generally perpendicular to the parallel planes of the cell containers 5a, 5b and adjacent to a transverse edge 19, to provide a compact package that nests within the casing halves 2, 3.

Figure 6:
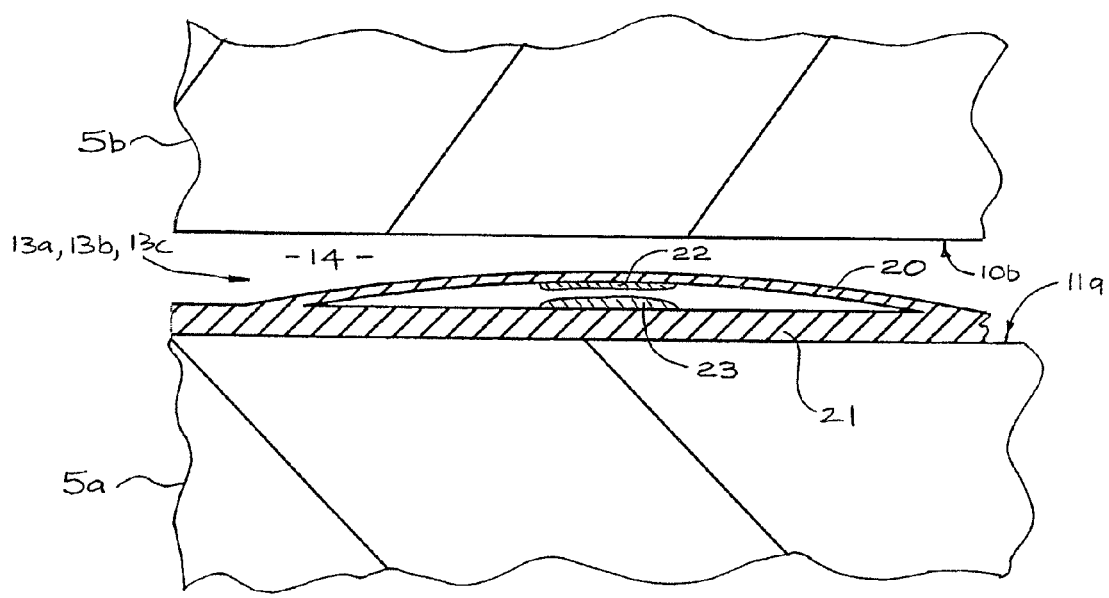
FIG. 6 is a large-scale schematic cross-section through a switch element of the switch element of FIG. 4.
Figure 14:
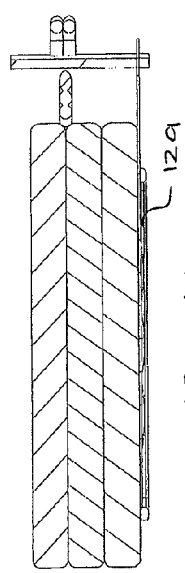
Figure 15:
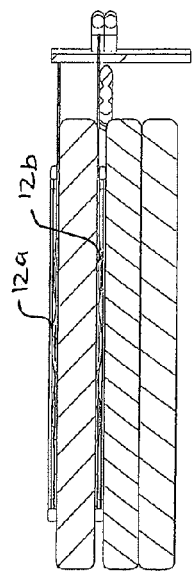
Figure 16:
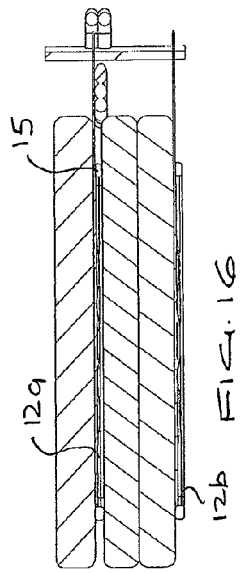
Figure 17:
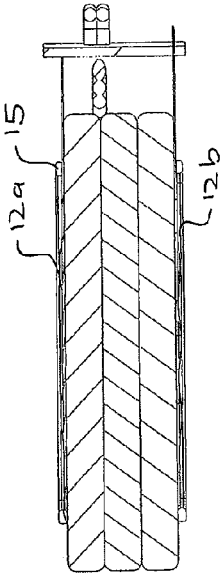
Figure 18:
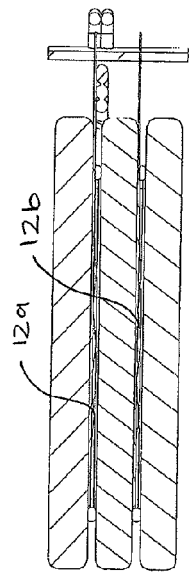
Figure 19:
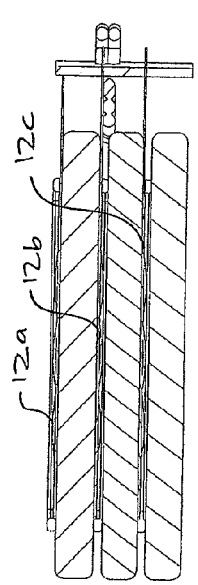
Figure 20:
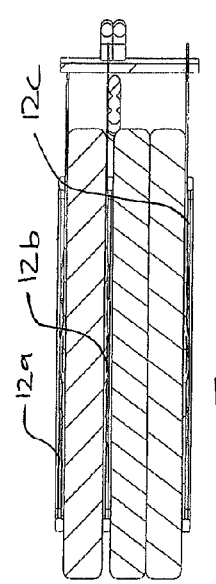
Figure 21:
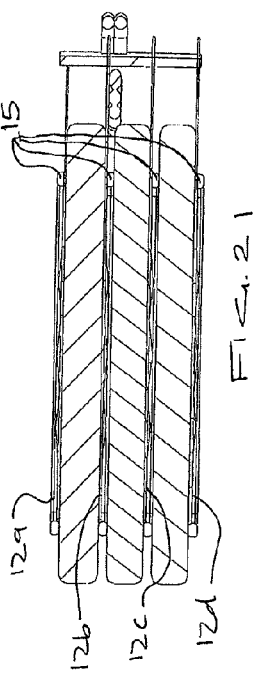

Referring to FIGS. 5 and 6, the sealed battery cell containers 5a, 5b each hold a positive and negative electrode 30, 31 and an electrolyte 32. The membrane switch assembly 12 is of a type comprising three normally-open switch elements 13a, 13b, 13c electrically connected in parallel. As used herein the term "membrane switch" refers to a pressure-sensitive momentary switch in which at least one electrical contact is on, or made of, a thin flexible substrate. Each of the switch elements 13a, 13b, 13c includes thin flexible substrates 20, 21 each carrying a respective pole 22, 23 held apart by resilient action of the dome-shaped substrate 20. The substrate 21 abuts the surface 11a of cell container 5a and substrate 20 is spaced apart from surface 10b of cell container 5b such that bulging of either of the cell containers 5a, 5b beyond a predetermined value will close the switch.

In an alternative arrangement not shown, instead of being normally open, the switch elements 13a, 13b, 13c may be normally closed with both poled carried on one substrate and may, for example, be connected in the circuit in series such that each one provides a cut-off switch for breaking the electrical continuity of the assembly.

When the battery cell containers 5a, 5b are pressurized internally, the relatively large major surfaces 10a, 10b, 11a, 11b tend to bulge outwardly. In use, the outer cover 18 not only holds the cell containers 5a, 5b together, it also serves to stiffen outer surfaces 10a, 11b against which it is held. Any internal pressure increase in one or both of the cell containers 5a, 5b preferentially deflects one or both of the inner surfaces 10b, 11a, compressing the switch elements 13a-13b. The PCB 6 includes a controller that detects a current flow when at least one of the switch elements 13a, 13b, 13c has closed and then acts to open a cut-off switch 34 electrically connected in series in the circuit 33, thereby preventing current flow to or from the cell containers 5a, 5b.

The invention lends itself to a large number is variations in the stacking of the containers 5a, 5b, switch assembly 12 and ring 15, some of which are schematically shown in FIGS. 7-21. In all of these variants a switch assembly 12 with three longitudinally aligned switch elements 13a, 13b, 13c is used as shown in FIG. 7, although it will be understood that any number and arrangement of switches may be used.

FIGS. 8 and 9 show second and third embodiments respectively, with each employing a single cell container 5. In the second embodiment one switch assembly 12 may abut the major surface 10a (FIG. 8) with the outer cover (not shown) conforming tightly to the outer surface 10b and face 17a. In the third embodiment (FIG. 9) switch assemblies 12a, 12b abut the major surfaces 10a, 10b respectively with the outer cover (not shown) conforming tightly to the outer faces 17a, 17b. The switch elements 13a, 13b, 13c etc of both of the switch assemblies 12a, 12b are connected in parallel, such that the controller PCB 6 can operate the cut-off switch 34 in response to closure of any one of the switch elements.

The fourth, fifth and sixth embodiments of FIGS. 10-12 show the stacking of two cell container 5a, 5b with one, two or three switch assemblies 12a, 12b, 12c respectively. The seventh to fifteenth embodiments of FIGS. 13-21 show the stacking of three cell container 5a, 5b, 5c with one, two, three or four switch assemblies 12a, 12b, 12c, 12d respectively. In each of these embodiments the size of the outer cover (not shown) varies to firmly fit about the components and hold them together. It will be apparent from these embodiments that any switch assembly 12 should abut at least one major surface of a cell container 5.

Figure 23:
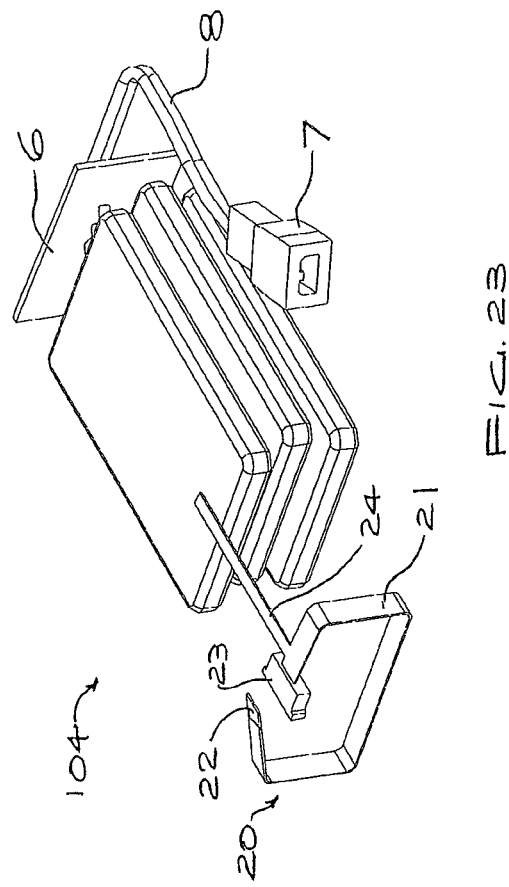
FIG. 23 is an exploded pictorial view of the cell and circuit assembly of FIG. 22.
Figure 22:
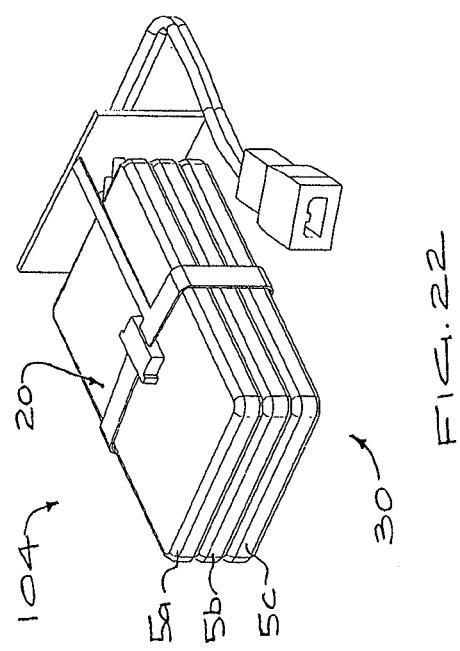
FIG. 22 is a pictorial view of the cell and circuit assembly of a sixteenth embodiment of the invention.

A sixteenth embodiment of the invention is shown in FIGS. 22 and 23 and the illustrated cell and circuit assembly 104 is enclosed in shell-type casing halves 2, 3 to provide a battery assembly. In this embodiment of the deflection-responsive assembly the coupling structure is in the form of band assembly 20, with integrated contacts forming a cut-off switch.

The band assembly 20 includes a band 21 which extends transversely about the stack 30 of cell containers 5a, 5b, 5c and has male and female couplers 22, 23 at opposing ends. A connecting strip 24 electrically connects the band 21 to the PCB 6. Connecting the couplers 22, 23 mechanically holds the band 21 firmly in contact with the outer faces of the stack of cell containers 5a, 5b, 5c (as seen in FIG. 23) and makes an electrical contact (not shown). Deflection of the walls of one of the cell containers 5a, 5b, 5c acts to tension the band 21 tending to separate the couplers 22, 23 (as seen in FIG. 24)

and a pre-determined deflection is sufficient to separate the couplers 22, 23 and thereby break the electrical contact. The electrical contacts (not shown) may form a cut-off switch which breaks the electrical continuity of the assembly, or the controller may sense a current flow through the closed contacts to operate a separate cut-off switch. This band assembly 20 may be used in like manner with a single cell container, or any number of stacked cell containers.

Aspects of the present invention have been described by way of example only and it should be appreciated that modifications and additions may be made thereto without departing from the scope thereof.

The invention claimed is:

1. A battery assembly comprising:
    a sealed battery cell container holding a positive and negative electrode and an electrolyte, the container having a first outer face and a second opposite outer face;
    a cut-off switch electrically connected between one of the electrodes and an output of the battery assembly, the cut-off switch having a normally closed state and an open state for controlling the electrical continuity of the battery assembly, and
    deflection-responsive means comprising:
        a switch assembly for controlling the operation of said cut-off switch, the switch assembly disposed adjacent to the first outer face of the container wherein deflection of the first outer face moves the switch assembly between an open state and a closed state, said switch assembly including a membrane switch having a pair of poles wherein one of said pair of poles is disposed on a dome-shaped substrate for biasing said one pole away from said other pole; and
        an outer cover surrounding the container and the switch assembly.

2. The battery assembly of claim 1 wherein the deflection-responsive means further comprises a coupling structure fixed to the cell container and forming a cavity between the first outer face and the coupling structure, the switch assembly being disposed within the cavity.

3. The battery assembly of claim 1 further comprising:
    a plurality of sealed battery cell containers, each with opposing major outer faces;
    the deflection-responsive means further comprising:
        a coupling structure disposed between cell containers and forming a cavity between two directly adjacent outer faces, wherein the switch assembly is disposed in the cavity.

4. The battery assembly of claim 3 wherein the deflection-responsive means further includes a control circuit operating the cut-off switch in response to a change of state of the switch assembly.

5. The battery assembly of claim 3 wherein the coupling structure comprises a ring extending around the cavity and held between the two adjacent outer faces.

6. The battery assembly of claim 1 wherein the membrane switch comprises an array of switch elements.

7. The battery assembly of claim 6 wherein the array is a linear array aligned with a central axis of both adjacent outer faces, with one switch element lying between central parts of the adjacent outer faces.

8. The battery assembly of claim 7 wherein the switch elements are normally-open switch elements electrically connected in parallel.

9. The battery assembly of claim 4 wherein the coupling structure comprises a tubular member, the opposing major outer faces of the plurality of containers are substantially planar and parallel, and the control circuit includes a PCB lying in a plane substantially orthogonal to a plane of the opposing major outer faces.

10. The battery assembly of claim 9 further comprising an output that includes a cable connected at one end to the PCB and at another end to an output jack for making an electrical connection to the battery assembly, wherein the plurality of cell containers, the coupling structure and the PCB are enclosed between shell-type casing halves from which the cable and output jack protrude.

11. The battery assembly of claim 1 wherein the outer cover is disposed next to the second outer face of the battery cell container to stiffen the second outer face.

12. The battery assembly of claim 11 wherein the cell container includes a plurality of sealed battery cell containers, the cell containers being layered to form a stack with outer stack faces.

13. The battery assembly of any one of claims 1, 2, 12 to 5 and 6 to 10 wherein the battery cell containers are lithium ion battery cell containers.

14. A battery assembly comprising:
    a sealed battery cell container for holding a positive electrode, a negative electrode and an electrolyte, the container having outer faces;
    a cut-off switch for controlling the electrical continuity of the battery assembly, the cut-off switch electrically having a first connector and a mating second connector, and
    deflection-responsive means comprising:
        a loop-shaped band connected at one end to the first connector of the cut-off switch and at another end to the second mating connector, the loop-shaped band extending around the outer periphery of the sealed battery cell container and disposed in contact with more than one outer face of the sealed battery cell container wherein deflection of any of the outer faces in contact with the band applies tension to the band thereby causing the first connector and the mating second connecter to disengage from each other.

* * * * *